United States Patent
Zhang et al.

(10) Patent No.: US 8,885,520 B2
(45) Date of Patent: Nov. 11, 2014

(54) MULTI-HOP NETWORK TOPOLOGY SYSTEM AND METHOD

(75) Inventors: Hang Zhang, Nepean (CA); Peiying Zhu, Kanata (CA); Wen Tong, Ottawa (CA); Mo-Han Fong, L'Original (CA); Nimal Gamini Senarath, Nepean (CA); David Steer, Nepean (CA); Derek Yu, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 783 days.

(21) Appl. No.: 12/375,499

(22) PCT Filed: Jul. 27, 2007

(86) PCT No.: PCT/CA2007/001328
§ 371 (c)(1),
(2), (4) Date: Jan. 28, 2009

(87) PCT Pub. No.: WO2008/011717
PCT Pub. Date: Jan. 31, 2008

(65) Prior Publication Data
US 2009/0252065 A1  Oct. 8, 2009

Related U.S. Application Data

(60) Provisional application No. 60/820,692, filed on Jul. 28, 2006.

(51) Int. Cl.
*H04L 12/28* (2006.01)
*H04B 7/14* (2006.01)
(Continued)

(52) U.S. Cl.
CPC .......... *H04W 40/248* (2013.01); *H04W 40/22* (2013.01); *H04L 41/082* (2013.01); *H04L 45/22* (2013.01); *H04L 45/28* (2013.01); *H04L 45/308* (2013.01); *H04L 41/5025* (2013.01); *H04W 40/12* (2013.01); *H04L 41/0856* (2013.01); *H04L 45/122* (2013.01); *H04W 40/04* (2013.01); *H04B 7/2606* (2013.01)
USPC .......................................... 370/256; 370/315

(58) Field of Classification Search
CPC ......... H04L 45/48; H04L 45/02; H04L 45/22; H04L 45/24
USPC ......... 370/256, 338, 274, 279, 285, 293, 315, 370/401, 492, 501
See application file for complete search history.

(56) References Cited

U.S. PATENT DOCUMENTS 5,768,276 A  6/1998  Diachina et al.
6,046,992 A  4/2000  Meier et al.
(Continued)

FOREIGN PATENT DOCUMENTS

EP  1519518  3/2005

OTHER PUBLICATIONS

International Search Report and Written Opinion dated Nov. 30, 2007 for International Application No. PCT/CA2007/001328, International Filing Date Jul. 27, 2007 (16-pages).

(Continued)

*Primary Examiner* — Hoang-Chuong Vu
(74) *Attorney, Agent, or Firm* — Fish & Richardson P.C.

(57) ABSTRACT

A wireless communication system and method for a network having a tree topology. An initial path from a base station to an end relay node is selected. The path selection includes an active communication path and a redundant communication path. The path selection is based on at least one policy factor. The at least one policy factor is monitored and the path is updated based on a change to the monitored at least one policy factor.

15 Claims, 9 Drawing Sheets

(51) Int. Cl.
| | |
|---|---|
| *H04J 1/10* | (2006.01) |
| *H04W 40/22* | (2009.01) |
| *H04L 12/24* | (2006.01) |
| *H04L 12/707* | (2013.01) |
| *H04L 12/703* | (2013.01) |
| *H04L 12/725* | (2013.01) |
| *H04W 40/24* | (2009.01) |
| *H04L 12/733* | (2013.01) |
| *H04W 40/12* | (2009.01) |
| *H04W 40/04* | (2009.01) |
| *H04B 7/26* | (2006.01) |

(56) References Cited

U.S. PATENT DOCUMENTS

| | | | |
|---|---|---|---|
| 6,049,538 A * | 4/2000 | Scott | 370/347 |
| 6,115,580 A * | 9/2000 | Chuprun et al. | 455/1 |
| 6,407,991 B1 | 6/2002 | Meier | |
| 6,539,028 B1 * | 3/2003 | Soh et al. | 370/445 |
| 6,574,267 B1 * | 6/2003 | Kanterakis et al. | 375/141 |
| 6,590,928 B1 * | 7/2003 | Haartsen | 375/134 |
| 6,690,657 B1 | 2/2004 | Lau et al. | |
| 7,106,814 B2 * | 9/2006 | Carsello | 375/343 |
| 7,321,611 B2 | 1/2008 | Fullerton et al. | |
| 7,535,838 B1 | 5/2009 | Mitchell et al. | |
| 7,609,751 B1 | 10/2009 | Giallorenzi et al. | |
| 7,706,390 B2 * | 4/2010 | Alapuranen | 370/406 |
| 2002/0086682 A1 | 7/2002 | Naghian | |
| 2003/0226091 A1 | 12/2003 | Platenberg et al. | |
| 2003/0233474 A1 * | 12/2003 | Yamamoto | 709/239 |
| 2004/0185780 A1 | 9/2004 | Coupechoux et al. | |
| 2004/0208253 A1 | 10/2004 | Joo | |
| 2004/0233882 A1 | 11/2004 | Park et al. | |
| 2005/0068979 A1 | 3/2005 | Boer et al. | |
| 2005/0079883 A1 * | 4/2005 | Khawand et al. | 455/502 |
| 2005/0176401 A1 | 8/2005 | Nanda et al. | |
| 2005/0271060 A1 * | 12/2005 | Kodialam et al. | 370/394 |
| 2006/0203926 A1 * | 9/2006 | Chiodini | 375/260 |
| 2006/0256709 A1 | 11/2006 | Yang | |
| 2007/0072600 A1 * | 3/2007 | Cho et al. | 455/423 |
| 2007/0091854 A1 * | 4/2007 | Sinnarajah et al. | 370/335 |
| 2007/0129075 A1 * | 6/2007 | Kim et al. | 455/436 |
| 2007/0155315 A1 | 7/2007 | Lee et al. | |
| 2007/0217353 A1 | 9/2007 | Asa et al. | |
| 2007/0280117 A1 | 12/2007 | Katz et al. | |
| 2007/0298778 A1 | 12/2007 | Chion et al. | |
| 2008/0016338 A1 * | 1/2008 | Sun | 713/163 |
| 2008/0192713 A1 * | 8/2008 | Mighani et al. | 370/338 |
| 2009/0213833 A1 | 8/2009 | Cai et al. | |

OTHER PUBLICATIONS

"Performance Impact of More than 2-Hop Relay; C80216j-06_082r2"; IEEE Draft; C80216J-06_082R2, IEEE—SA, Piscataway, New Jersey, vol. 802.16j; Jul. 12, 2006; pp. 1-9.

Office Action issued in U.S. Appl. No. 12/375,478 on Aug. 30, 2010; 20 pages.

Office Action issued in U.S. Appl. No. 12/375,478 on Feb. 2, 2011; 21 pages.

Office Action issued in U.S. Appl. No. 12/375,478 on Mar. 2, 2012; 18 pages.

International Preliminary Report on Patentability issued in International Application No. PCT/CA2007/001328 on Feb. 3, 2009; 7 pages.

International Search Report and Written Opinion of the International Search Authority issued in International Application No. PCT/CA2007/001329 on Oct. 12, 2007; 13 pages.

International Preliminary Report on Patentability issued in International Application No. PCT/CA2007/001329 on Feb. 3, 2009; 7 pages.

Office Action issued in U.S. Appl. No. 12/375,478 on Nov. 20, 2012; 13 pages.

Supplementary European Search Report dated Mar. 15, 2012 for European Patent Application No. 07 784 4994.1, Regional Stage Entry date of Jul. 27, 2007 consisting of 5-pages.

"Performancee Impact of more than 2-Hop Relay: C80216j-06_082r2", IEEE Draft: C80216J-06_082R2, IEEE—SA, vol. 802.16j, Jul. 12 2006, pp. 1-9, XP017628214 [retrieved on Jul. 13, 2006] *pp. 3-7*.

"Cooperative Relay in IEEE 802.16j MMR; C80216j-06_006", IEEE Draft: C80216J-06_006, IEEE—SA, Piscataway, NJ USA, vol. 802.16j, Apr. 1, 2006, pp. 1-10, XP017628067, [retrieved on May 28, 2006] *pp. 37*.

"Recommendation on IEEE 802.16j: C80216j-06_004r1", IEEE Draft: C80216J-06_004R1, IEEE—SA, Piscataway, NJ USA, vol. 802.16j, May 8, 2006, pp. 1-14, XP017628064, [retrieved on May 28, 2006] *pp. 4-7*.

Handover Schemes in IEEE 802.16j: C80216j-06_005r1:, IEEE Draft: C80216J-06_005R1, IEEE—SA, Piscataway, NJ USA, vol. 802.16j, May 8, 2006, pp. 1-14, XP017628066, [retrieved on May 28, 2006], *pp. 7, 8*.

Office Action issued in U.S. Appl. No. 12/375,478 on Oct. 9, 2013; 15 pages.

Office Action issued in U.S. Appl. No. 13/618,620 on May 7, 2013; 7 pages.

Office Action issued in U.S. Appl. No. 13/619,849 on Jun. 5, 2013; 7 pages.

Communication Pursuant to Article 94(3) EPC issued on Oct. 1, 2013; 5 pages.

Office Action issued in U.S. Appl. No. 12/375,478 on May 22, 2014. Communication under Rule 71(3) EPC issued in European Application No. 07784994.1 on May 26, 2014; 7 pages.

* cited by examiner

MULTI-HOP NETWORK TOPOLOGY SYSTEM AND METHOD

CROSS-REFERENCE TO RELATED APPLICATIONS

This application is a Submission Under 35 U.S.C. §371 for U.S. National Stage Patent Application of International Application Number PCT/CA2007/001328, filed Jul. 27, 2007 entitled "MULTI-HOP NETWORK TOPOLOGY SYSTEM AND METHOD", which claims priority to U.S. Provisional Application Ser. No. 60/820,692, filed Jul. 28, 2006, the entirety of all which are incorporated herein by reference.

FIELD OF THE INVENTION

The present invention relates to a method and system for wireless communication and in particular to a method and system for wireless communication using relay nodes.

BACKGROUND OF THE INVENTION

As the demand for high speed broadband networking over wireless communication links increases, so too does the demand for different types of networks that can accommodate high speed wireless networking. For example, the deployment of IEEE 802.11 wireless networks in homes and business to create Internet access "hot spots" has become prevalent in today's society. However, these IEEE 802.11-based networks are limited in bandwidth as well as distance. For example, maximum typical throughput from a user device to a wireless access point is 54 MB/sec. at a range of only a hundred meters or so. In contrast, while wireless range can be extended through other technologies such as cellular technology, data throughput using current cellular technologies is limited to a few MB/sec. Put simply, as the distance from the base station increase, the need for higher transmission power increases and the maximum data rate typically decreases. As a result, there is a need to support high speed wireless connectivity beyond a short distance such as within a home or office.

As a result of the demand for longer range wireless networking, the IEEE 802.16 standard was developed. The IEEE 802.16 standard is often referred to as WiMAX or less commonly as WirelessMAN or the Air Interface Standard. This standard provides a specification for broadband wireless metropolitan access networks ("MAN"s) that use a point-to-multipoint architecture. Such communications can be implemented, for example, using orthogonal frequency division multiplexing ("OFDM") communication. OFDM communication uses a multi-carrier technique that distributes the data over a number of carriers that are spaced apart at precise frequencies. This spacing provides the "orthogonality" that prevents the demodulators from seeing frequencies other than their own.

The 802.16 standard supports high bit rates in both the uplink to and downlink from a base station up to a distance of 30 miles to handle such services as VoIP, IP connectivity and other voice and data formats. Expected data throughput for a typical WiMAX network is 45 MBits/sec. per channel. The 802.16e standard defines a media access control ("MAC") layer that supports multiple physical layer specifications customized for the frequency band of use and their associated regulations. However, the 802.16e standard does not provide support for multi-hop networks that use relay nodes.

802.16 networks, such as 802.16j networks, can be deployed as multi-hop networks from the subscriber equipment to the carrier base station. In other words, in multi-hop networks, the subscriber device can communicate with the base station directly or through one or more intermediate devices.

The complexity involved in supporting multi-hop networks in a robust manner necessarily involves sophisticated control layer protocols. Such protocols do not exist. For example, as noted above, the IEEE 802.16e standard does not support multi-hop networks. The IEEE 802.16j standard for supporting multi-hop networks has been proposed, but the standard supports only a tree-based topology and does not provide good arrangements or methods for advanced topology support such as active and redundant path selection, i.e., path diversity, topology learning and congestion control for wireless communication from the mobile station to the supporting base station. As such, relay-based networks implemented under the existing IEEE 802.16j standard do not provide a reliable communication environment that can easily react to congestion and topology changes whether through the addition or subtraction of a relay node as part a normal business process or as a result of a failure or error condition within the network.

It is therefore desirable to have method and system that provides an arrangement to support such topology-related aspects of wireless networks that include relay stations. Such topology-related aspects include congestion control, topology learning and path diversity from the mobile station to the base station via relay nodes (also referred to herein as "relay stations"), including but not limited to those operating in accordance with the IEEE 802.16 standards.

Current IEEE 802.16 mobile stations are typically arranged to communicate using the IEEE 802.16e standard. As such, in order to maintain backward compatibility, relay stations configured to be serving stations (deliver/collect traffic to/from mobile stations) are arranged to transmit an 802.16e preamble to facilitate cell selection by the mobile station. However, a problem will arise in an environment in which relay stations are implemented in a wireless network that is arranged to support the desired topology-related aspects described above. For example, in order to support removal and addition of new relay stations, existing relay stations would need to monitor their operating environments to synchronize operation for path reselection. This would be done via monitoring preamble transmissions from neighboring relay stations. As such, a single radio relay node wanting to monitor preambles to support topology-related changes would stop its own IEEE 802.16e preamble transmission thereby adversely impacting the normal operation of supported mobile stations.

It is therefore also desirable to have a wireless communication network arrangement that allows relay nodes to both transmit and monitor preambles to support mobile stations as well as topology-related changes.

SUMMARY OF THE INVENTION

The present invention advantageously provides a method and system for supporting topology changes in wireless communication networks, including but not limited to those operating under the IEEE 802.16j standard.

In accordance with one aspect, the present invention provides a wireless communication method for a network having a tree topology. An initial path from a base station to an end relay node is selected. The path selection includes an active communication path and a redundant communication path.

The path selection is based on at least one policy factor. The at least one policy factor is monitored and the path is updated based on a change to the monitored at least one policy factor. Optionally, the network is an IEEE 802.16j network.

In accordance with another aspect, the present invention provides a wireless communication system having a tree topology in which there is a base station. A first relay node is in communication with the base station. A second relay node is in direct communication with at least one of the base station and the first relay node. An active communication path is established from the base station to the second relay node and a redundant communication path is established from the base station to the second relay node. The redundant communication path is different than the active communication path. At least one of the active communication path and the redundant communication path include the first relay node.

In accordance with still another aspect, the present invention provides a method for using a relay node preamble to evaluate a wireless communication radio environment. A monitoring cycle is randomly selecting from a monitoring cycle selection base in which the monitoring cycle selection base has a plurality of preamble cycles. Transmission of the relay node preamble is stopped by the relay node during the selected monitoring cycle. Relay node preambles are transmitted by the relay node during the remaining preamble cycles.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

It is noted that various multi-hop communication schemes are described herein in accordance with the present invention. While described in the context of the Institute of Electrical and Electronics Engineers ("IEEE") 802.16 standards, one of ordinary skill in the art will appreciate that the broader inventions described herein are not limited in this regard and merely for exemplary and explanatory purposes.

According to the present invention, various media access control ("MAC") layer designs for downlink communications between a base station ("BS") and a relay station ("RS") and between a RS and RS are described. One of ordinary skill in the art will appreciate that the invention described herein is not limited solely to use with downlink communications but is equally applicable to uplink communications as well, for example between a mobile station ("MS") and RS, a RS and RS, and a RS and BS.

According to one embodiment of the invention a Relay Station MAC (R-MAC) layer is introduced. According to another embodiment the existing IEEE 802.16e MAC is modified to implement and support the features and functions described herein.

Figure 1:
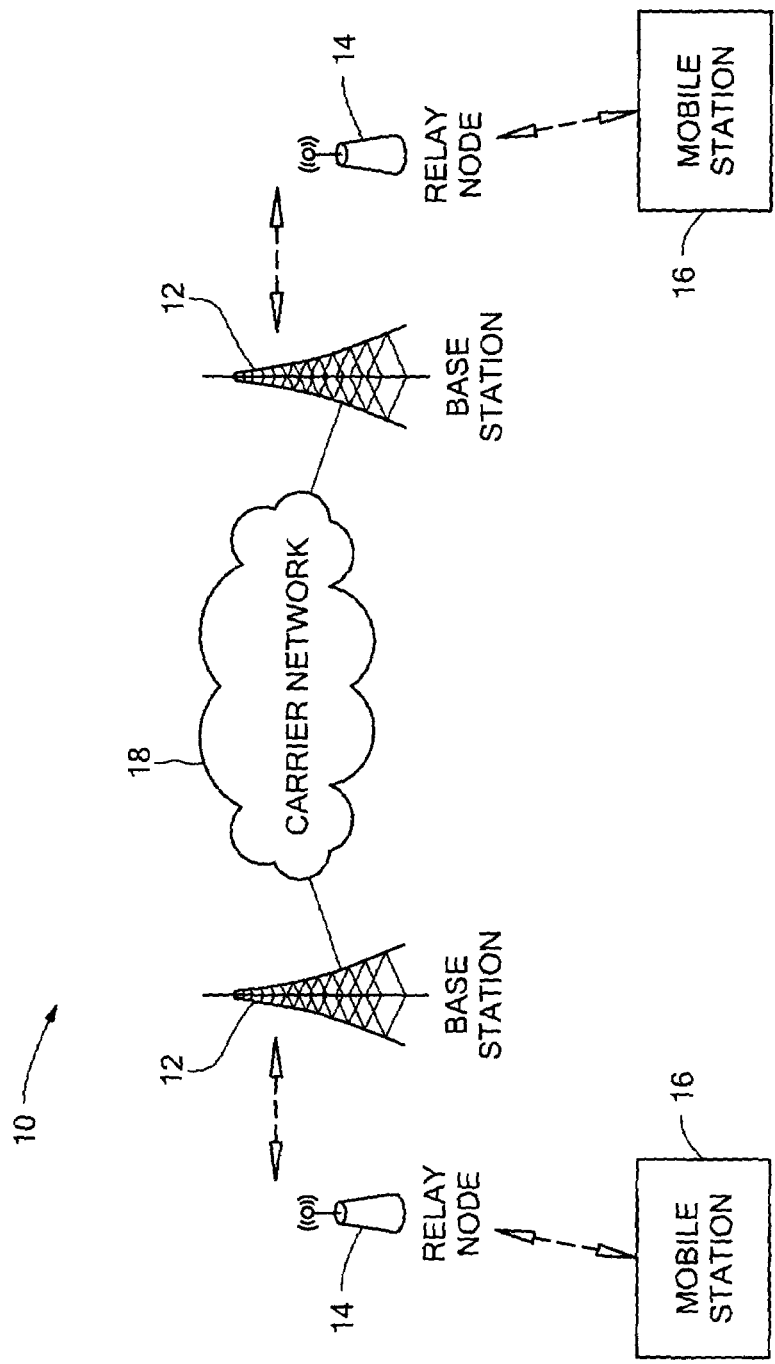
FIG. 1 is a diagram of an embodiment of a system constructed in accordance with the principles of the present invention.

Referring now to the drawing figures in which like reference designators refer to like elements, there is shown in FIG. 1, a system constructed in accordance with the principles of the present invention and designated generally as "10." System 10 includes base stations 12, relay nodes 14 and mobile stations 16. Base stations 12 communicate with one another and with external networks, such as the Internet (not shown), via carrier network 18. Base stations 12 engage in wireless communication with relay nodes 14 and/or mobile stations 16. Similarly, mobile stations 16 engage in wireless communication with relay nodes 14 and/or base stations 12.

Base station 12 can be any base station arranged to wirelessly communicate with relay nodes 14 and/or mobile stations 16. Base stations 12 include the hardware and software used to implement the functions described herein to support the MAC control plane functions. Base stations 12 include a central processing unit, transmitter, receiver, I/O devices and storage such as volatile and nonvolatile memory as may be needed to implement the functions described herein. Base stations 12 are described in additional detail below.

Mobile stations 16, also described in detail below, can be any mobile station including but not limited to a computing device equipped for wireless communication, cell phone, wireless personal digital assistant ("PDA") and the like. Mobile stations 16 also include the hardware and software suitable to support the MAC control plane functions needed to engage in wireless communication with base station 12 either directly or via one or more relay nodes 14. Such hardware can include a receiver, transmitter, central processing unit, storage in the form of volatile and nonvolatile memory, input/output devices, etc.

Relay node 14 is used to facilitate wireless communication between mobile station and base station 12 in the uplink (mobile station 16 to base station 12) and/or the downlink (base station 12 to mobile station 16). A relay node 14 configured in accordance with the principles of the present invention includes a central processing unit, storage in the form of volatile and/or nonvolatile memory, transmitter, receiver, input/output devices and the like. Relay node 14 also includes software to implement the MAC control functions described herein. Of note, the arrangement shown in FIG. 1 is general in nature and other specific communication embodiments constructed in accordance with the principles of the present invention are contemplated.

Although not shown, system 10 includes a base station controller ("BSC") or access service network ("ASN") gateway that controls wireless communications within multiple cells, which are served by corresponding base stations ("BS") 12. In general, each base station 12 facilitates communications using, for example OFDM, directly with mobile stations 16 or via one or more relay nodes 14, of which at least one of which is within the cell 12 associated with the corresponding base station 12. The movement of the mobile stations 16 (and mobile relay nodes 14) in relation to the base stations 12 results in significant fluctuation in channel conditions. It is contemplated that the base stations 12, relay nodes 14 and mobile stations 16 may include multiple antennas in a multiple input multiple output ("MIMO") arrangement to provide spatial diversity for communications.

A high level overview of the mobile stations 16 and base stations 12 of the present invention is provided prior to delving into the structural and functional details of the preferred embodiments. It is understood that relay nodes 14 can incorporate those structural and functional aspects described herein with respect to base stations 12 and mobile stations 16 as may be needed to perform the functions described herein.

Figure 2:
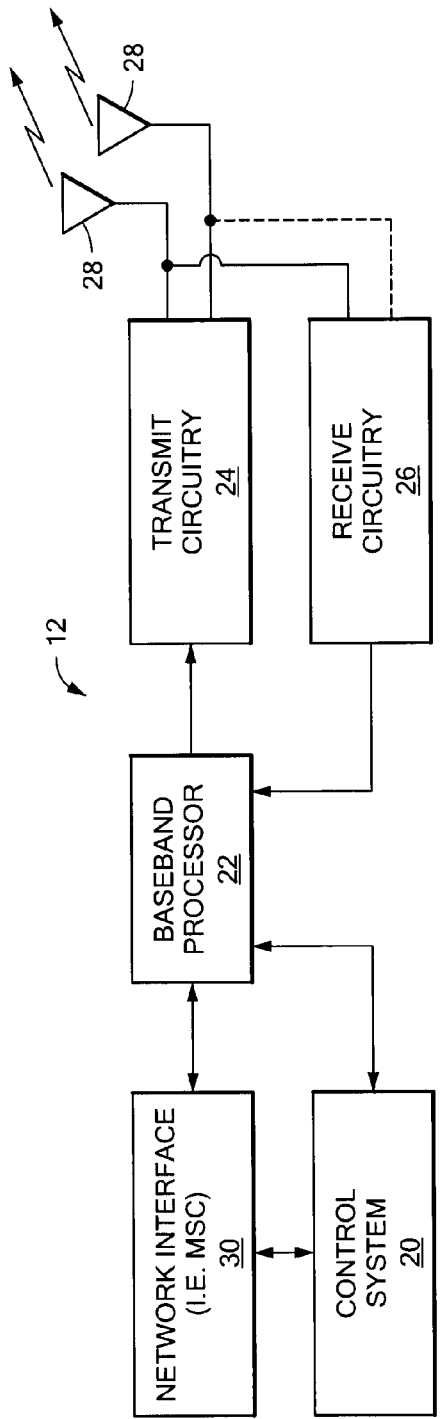
FIG. 2 is a block diagram of an exemplary base station constructed in accordance with the principles of the present invention.

With reference to FIG. 2, a base station 12 configured according to one embodiment of the present invention is illustrated. The base station 12 generally includes a control system 20 such as a central processing unit, a baseband processor 22, transmit circuitry 24, receive circuitry 26, multiple antennas 28, and a network interface 30. The receive circuitry 26 receives radio frequency signals bearing information from one or more remote transmitters provided by mobile stations 16 (illustrated in FIG. 3). Preferably, a low noise amplifier and a filter (not shown) cooperate to amplify and remove out-of-band interference from the signal for processing. Down conversion and digitization circuitry (not shown) then down converts the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors ("DSPs") or application-specific integrated circuits ("ASICs"). The received information is then sent across a wireless network via the network interface 30 or transmitted to another mobile station 16 serviced by the base station 12.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) amplifies the modulated carrier signal to a level appropriate for transmission, and delivers the modulated carrier signal to the antennas 28 through a matching network (not shown). Modulation and processing details are described in greater detail below.

Figure 3:
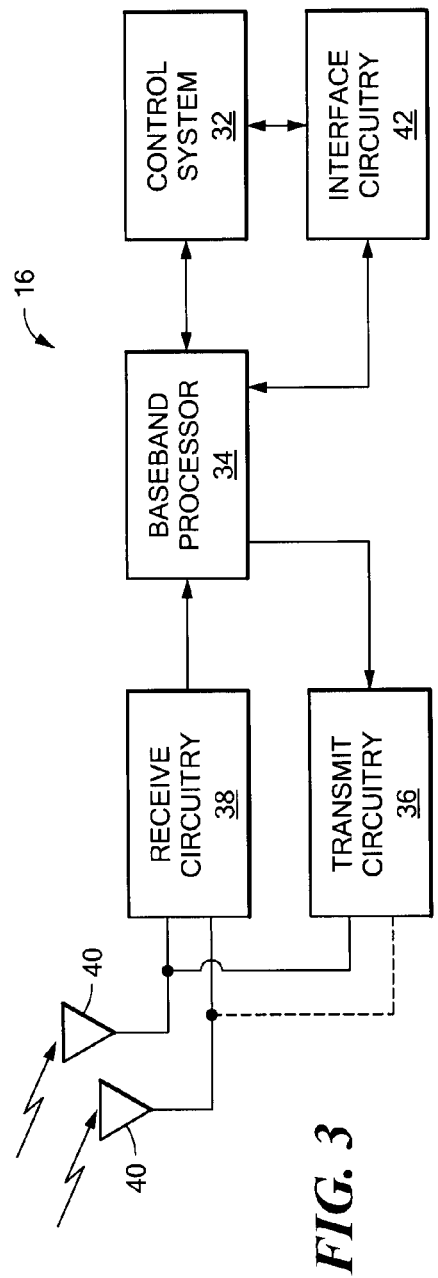
FIG. 3 is a block diagram of an exemplary mobile station constructed in accordance with the principles of the present invention.

With reference to FIG. 3, a mobile station 16 configured according to one embodiment of the present invention is described. Similar to base station 12, a mobile station 16 constructed in accordance with the principles of the present invention includes a control system 32, a baseband processor 34, transmit circuitry 36, receive circuitry 38, multiple antennas 40, and user interface circuitry 42. The receive circuitry 38 receives radio frequency signals bearing information from one or more base stations 12. Preferably, a low noise amplifier and a filter (not shown) cooperate to amplify and remove out-of-band interference from the signal for processing. Down conversion and digitization circuitry (not shown) then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors ("DSPs") and application specific integrated circuits ("ASICs").

With respect to transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) amplifies the modulated carrier signal to a level appropriate for transmission, and delivers the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation is implemented, for example, through the performance of an Inverse Fast Fourier Transform ("IFFT") on the information to be transmitted. For demodulation, a Fast Fourier Transform ("FFT") on the received signal is performed to recover the transmitted information. In practice, the IFFT and FFT are provided by digital signal processing carrying out an Inverse Discrete Fourier Transform (IDFT) and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is used for at least the downlink transmission from the base stations 12 to the mobile stations 16 via relay nodes 14. Each base station 12 is equipped with n transmit antennas 28, and each mobile station 16 is equipped with m receive antennas 40. Relay nodes 14 can include multiple transmit and receive antennas as well. Notably, the respective antennas can be used for reception and transmission using appropriate duplexers or switches and are so labeled only for clarity.

Figure 4:
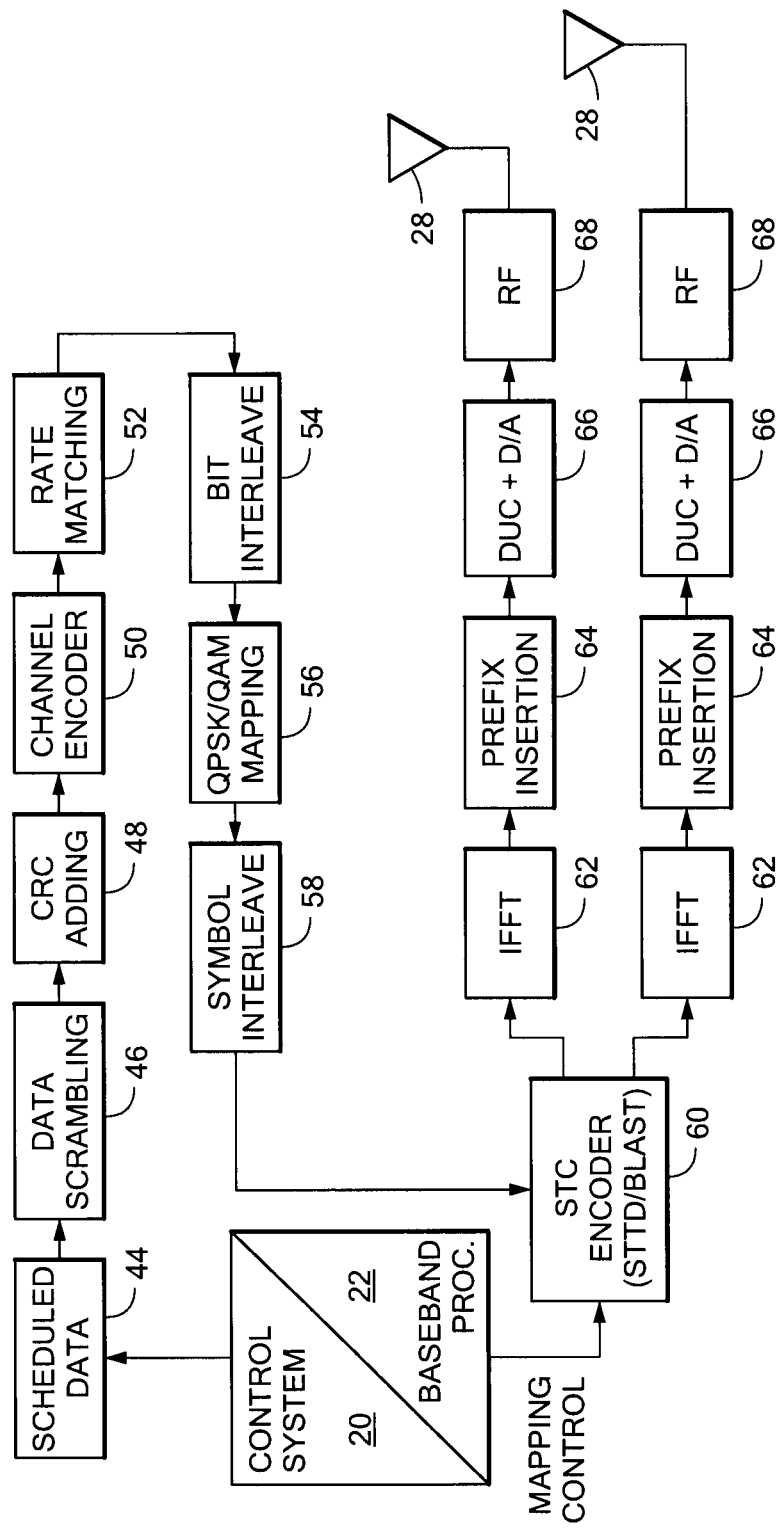
FIG. 4 is a block diagram of an exemplary OFDM architecture constructed in accordance with the principles of the present invention.

With reference to FIG. 4, a logical OFDM transmission architecture is described according to one embodiment. Initially, the base station controller 10 sends data to be transmitted to various mobile stations 16 to the base station 12. The base station 12 may use the channel quality indicators ("CQIs") associated with the mobile stations to schedule the data for transmission as well as select appropriate coding and modulation for transmitting the scheduled data. The CQIs may be provided directly by the mobile stations 16 or determined at the base station 12 based on information provided by the mobile stations 16. In either case, the CQI for each mobile station 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check ("CRC") for the scrambled data is determined and appended to the scrambled data using CRC adding logic 48. Next, channel coding is performed using channel encoder logic 50 to effectively add redundancy to the data to facilitate recovery and error correction at the mobile station 16. Again, the channel coding for a particular mobile station 16 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation ("QAM") or Quadrature Phase Shift Key ("QPSK") modulation is used. The degree of modulation is preferably chosen based on the CQI for the particular mobile station. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code ("STC") encoder logic 60, which modifies the symbols in a fashion making the transmitted signals more resistant to interference and more readily decoded at a mobile station 16. The STC encoder logic 60 will process the incoming symbols and provide n outputs corresponding to the number of transmit antennas 28 for the base station 12. The control system 20 and/or baseband processor 22 will provide a mapping control signal to control STC encoding. At this point, assume the symbols for the n outputs are representative of the data to be transmitted and capable of being recovered by the mobile station 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 12 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion ("DUC") and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile station 16 are scattered among the sub-carriers. The mobile station 16, which is discussed in detail below, will use the pilot signals for channel estimation.

Figure 5:
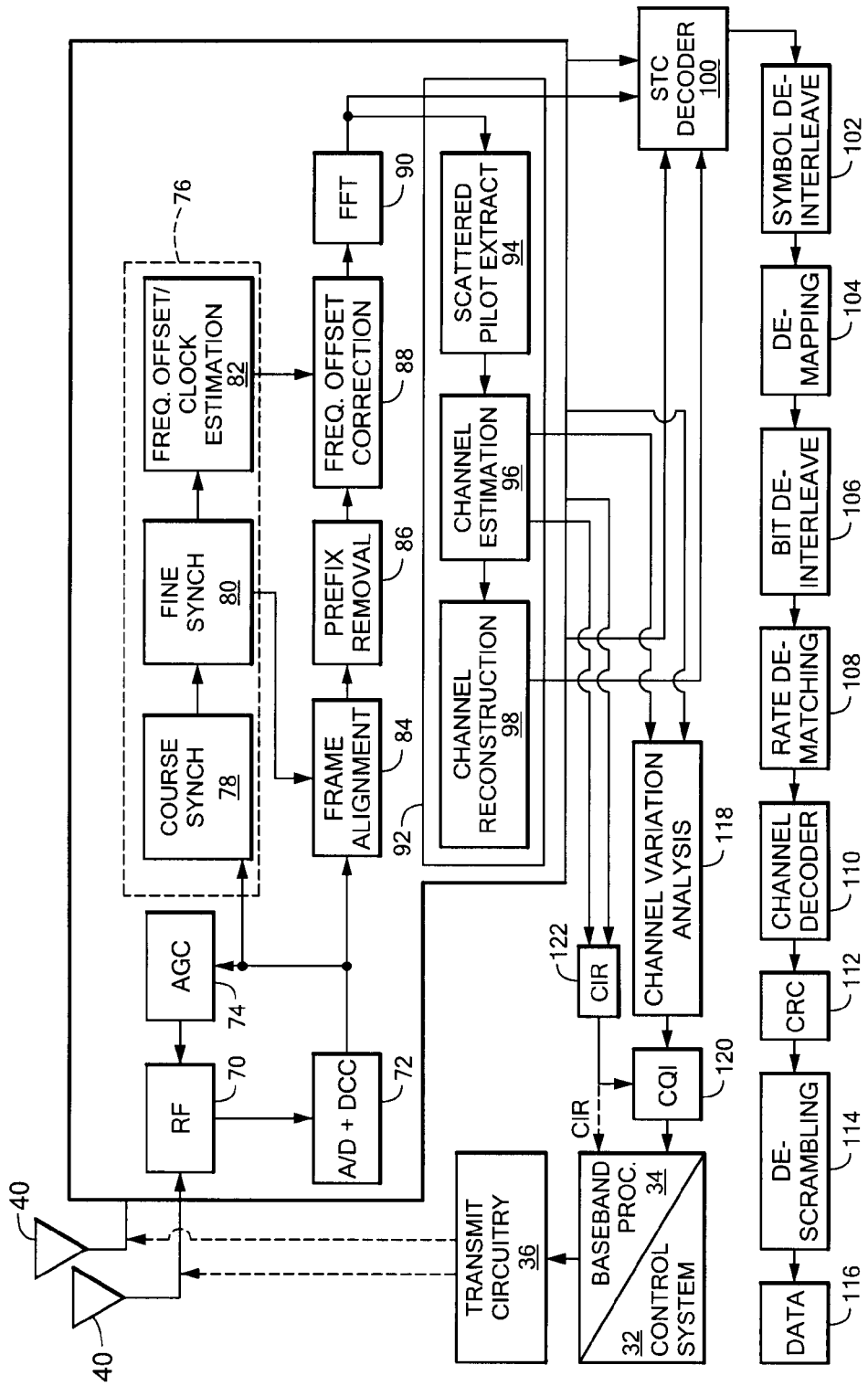
FIG. 5 is a block diagram of the flow of received signal processing in accordance with the principles of the present invention.

Reference is now made to FIG. 5 to illustrate reception of the transmitted signals by a mobile station 16. Upon arrival of the transmitted signals at each of the antennas 40 of the mobile station 16, the respective signals are demodulated and amplified by corresponding RF circuitry 70. For the sake of conciseness and clarity, only one of the receive paths is described and illustrated in detail, it being understood that a receive path exists for each antenna 40. Analog-to-digital ("A/D") converter and down-conversion circuitry 72 digitizes and downconverts the analog signal for digital processing. The resultant digitized signal may be used by automatic gain control circuitry ("AGC") 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 6:
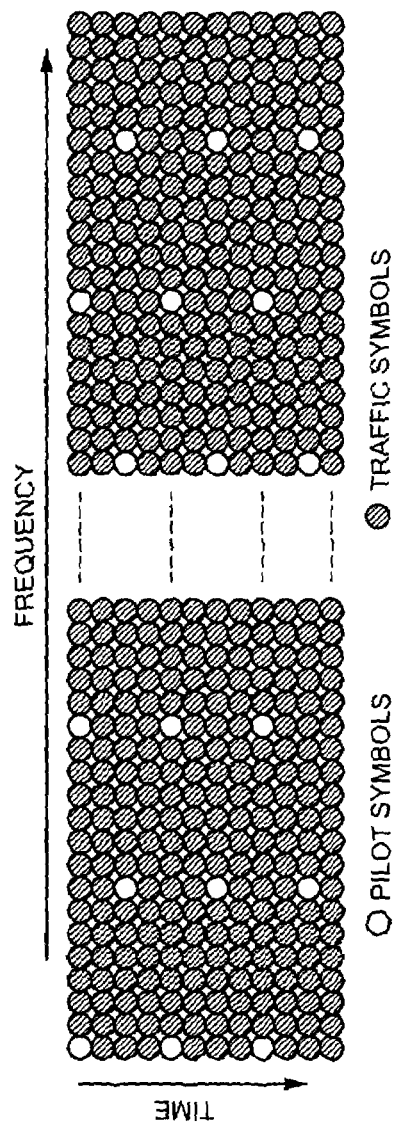
FIG. 6 is a diagram of an exemplary scattering of pilot symbols among available sub-carriers.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 6 illustrates an exemplary scattering of pilot symbols among available sub-carriers over a given time and frequency plot in an OFDM environment. Referring again to FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

Architecture

The present invention provides a method and system to extend the architecture of existing wireless communication systems, i.e. those implemented under IEEE 802.16j to support topology-related enhancements. These enhancements include but are not limited to active path and redundant path selection to enhance reliability support, topology learning and congestion control. Each are described in detail below. Such enhancements are implemented using a number of different architectures that include relay stations. For example, referring to FIG. 7, relay stations 14 and base station 12 can be implemented in a flat architecture in which all relay nodes 14 perform the same open systems interconnect ("OSI") physical layer 1 and media access control ("MAC") layer 2 functions. Of note, many of the figures herein show one or more relay nodes 14 in communication with base station 12. It is understood that, although not shown, mobile stations 16 are in communication with a base station 12 either directly or via one or more relay nodes 14. In other words, for the sake of simplicity, many drawing figures do not show mobile stations 16 because the present invention is concerned with the topology and communication among relay nodes 14 for communication with the serving base station 12.

Figure 7:
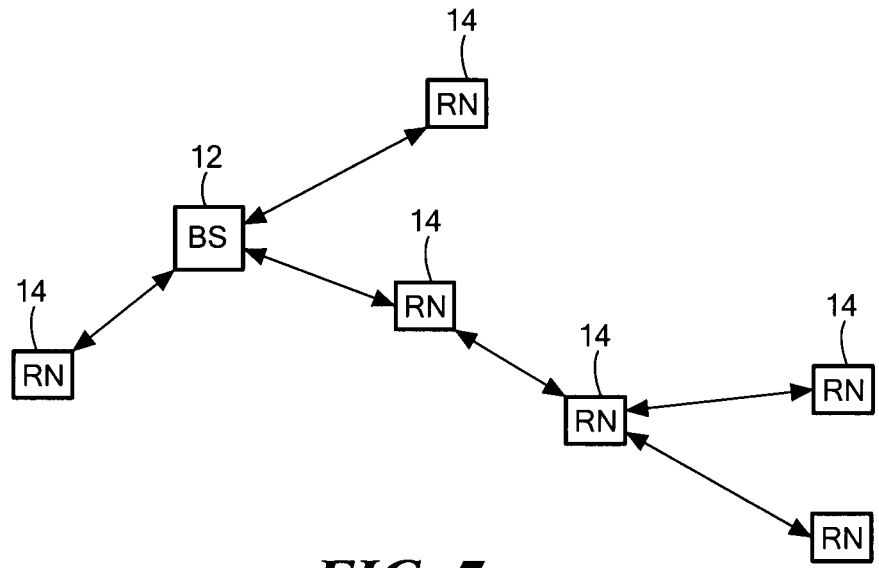
FIG. 7 is a block diagram of an exemplary flat network architecture constructed in accordance with the principles of the present invention.
Figure 8:
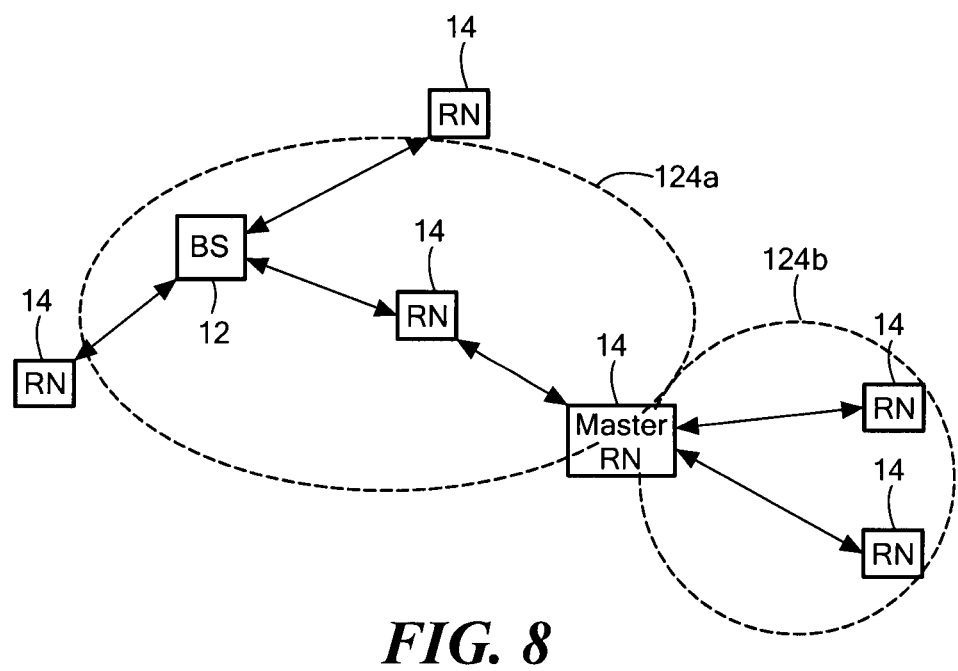
FIG. 8 is a block diagram of an exemplary hierarchical network architecture constructed in accordance with the principles of the present invention.

A different but related architecture is shown in FIG. 8 in which relay nodes 14 are in communication with base station 12 using a topology that is physically the same as the topology shown in FIG. 7, but where relay nodes 14 and base station 12 are arranged in a hierarchical structure. In this arrangement master relay node 14 performs more functions than a normal relay node 14 in order to distribute some of the complex functions performed by base station 12 to relay nodes 14. As shown in FIG. 8, master relay node 14 includes the OSI physical layer 1 and MAC layer 2 functions as well as some OSI network layer 3 functions. For example, encryption functions historically performed by base station 12 can be pushed to master relay node 14 to create communication regions 124a and 124b.

With the architectures of FIG. 7 and FIG. 8 in mind, the specific topology enhancements of the present invention noted above are now described in detail.

Active Path and Redundant Path Selection

Active Path and Redundant Path Selection involves the selection of an initial path through relay nodes 14 to base station 12 as well as the updating of the communication path through relay nodes 14 as may occur when a relay node 14 is added to or removed from system 10. The implementation of active and redundant path selection enhances reliability through the establishment of multiple communication paths through the network of relay nodes 14 but the use of only a single path at a time.

Active and redundant path selection can be based, for example, on the tree topology of networks implemented using IEEE 802.16j standard. However, the definition of the path through relay nodes 14 can be simplified as compared with other standards such as the IEEE 802.11s standard, since the ends of the path include a base station 12 and relay node 14 (wireless communication from relay node 14 to mobile station 16 is beyond the scope of the present invention and is not discussed herein).

Figure 9:
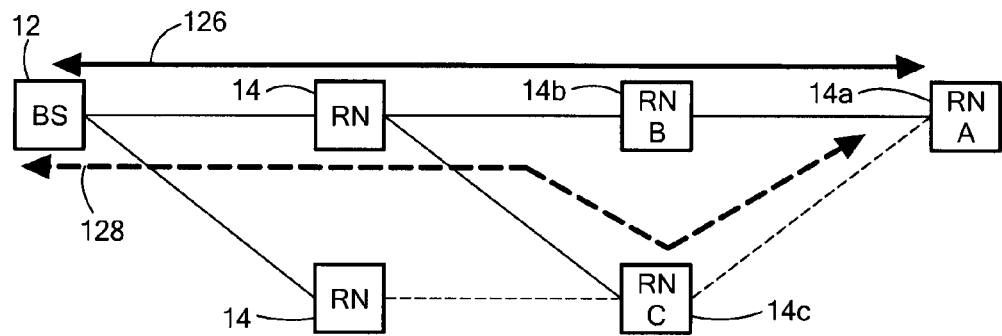
FIG. 9 is a block diagram of an exemplary network communication path constructed in accordance with the principles of the present invention.

In general, in accordance with the present invention, each relay node 14 selects, or is requested to select by corresponding serving base station 12 or a master relay node 14, one relay node 14 among its neighbor relay nodes 14 as its parent relay node 14, and one relay node 14 as its candidate relay node. Neighbor relay nodes 14 refer to those relay nodes 14 for which a radio link can be established. This arrangement is explained with reference to the relay node path diagram of FIG. 9. As is shown in FIG. 9, assume that a path optimization algorithm (the algorithms for determining a path to a network are known and are beyond the scope of the present invention) establishes the primary active path 126 as the active path from base station 12 to relay node A 14a. In this case, if relay node A 14a selects relay B 14b as its parent node relay node B 14b is the access relay node for relay node A 14a. In other words, the active path is the combination of the link between the ultimate relay node 14 (relay node 14a) and its parent relay node (relay node B 14b) plus the path of the parent relay node for relay node B 14b and so on.

The redundant path of a relay node is a combination of the link between relay node 14 and the candidate relay node 14 plus the path to the candidate relay node 14 from base station 12. For example, FIG. 9 fills redundant path 128 from base station 12 to relay node A 14a via candidate relay node C 14c. Of note, relay nodes having reference designators 14 that include a trailing alphabetic character, e.g. relay node A 14a, relay node B 14b, etc., are referred to collectively as relay nodes 14.

FIG. 9 also shows the tree topology for relay nodes 14 in which solid lines connecting relay nodes 14 and relay nodes 14 to base station 12 that are a part of the active tree as shown as solid lines while links among neighbor relay nodes that are not part of the active tree are shown as finely dashed lines.

Under existing standards, a relay node 14 can only have one parent. However, where there is diversity, a relay node 14 has multiple parents. Such may occur, for example when a relay node is in motion and is in soft handoff. In such a case, if the main parent relay node is thought of as an anchor, the tree structure can still be preserved and the diversity is reflected by path definition. The present invention provides two options for path definition, namely path definition by an equivalent path and path definition by a primary and assisted path arrangement. Each are discussed as follows.

Figure 10:
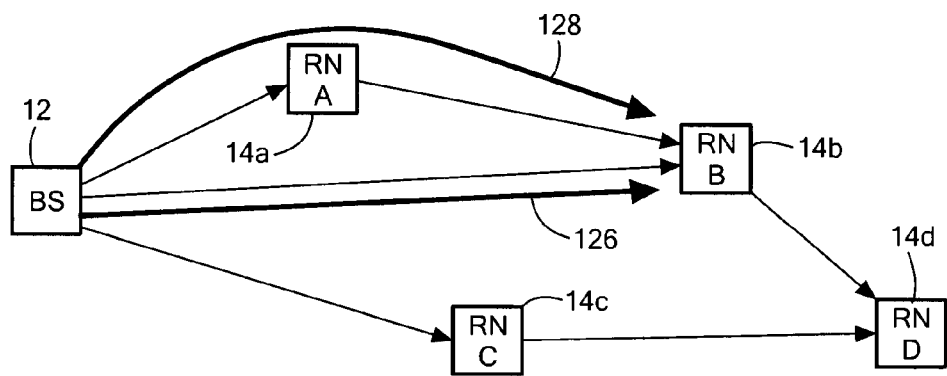
FIG. 10 is a block diagram showing a communication path definition constructed in accordance with the principles of the present invention.
Figure 11:
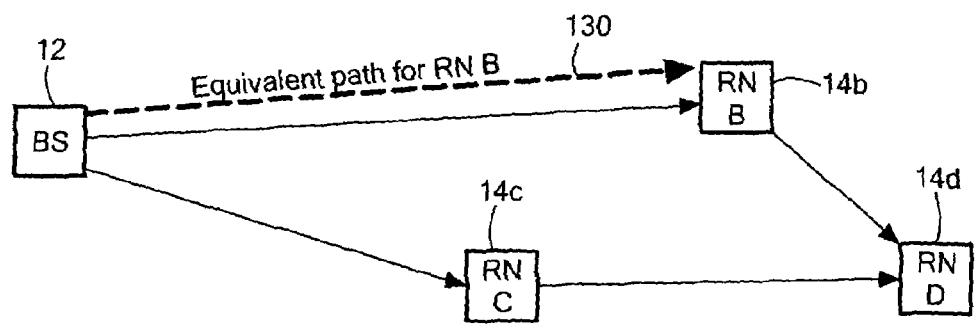
FIG. 11 is a block diagram showing the equivalent path definition of the path shown in FIG. 10.

Equivalent path definition is explained with reference to the relay node topology diagrams of FIGS. 10 and 11. FIG. 10 shows primary path 126 between base station 12 and relay node B 14b and alternate redundant path 128 between base station 12 and relay node B 14b via relay node A 14a. Because the two paths share the same end points, the primary path 126 and redundant path 128 are equivalent to a single combined path, shown as equivalent path 130 on FIG. 11. The path capacity, i.e. throughput, of the equivalent path can be defined as the effective data rate viewed from end relay node B 14b. In this case, those aspects of the wireless communication that need to refer to a tree structure can do so by considering the equivalent path only.

Figure 12:
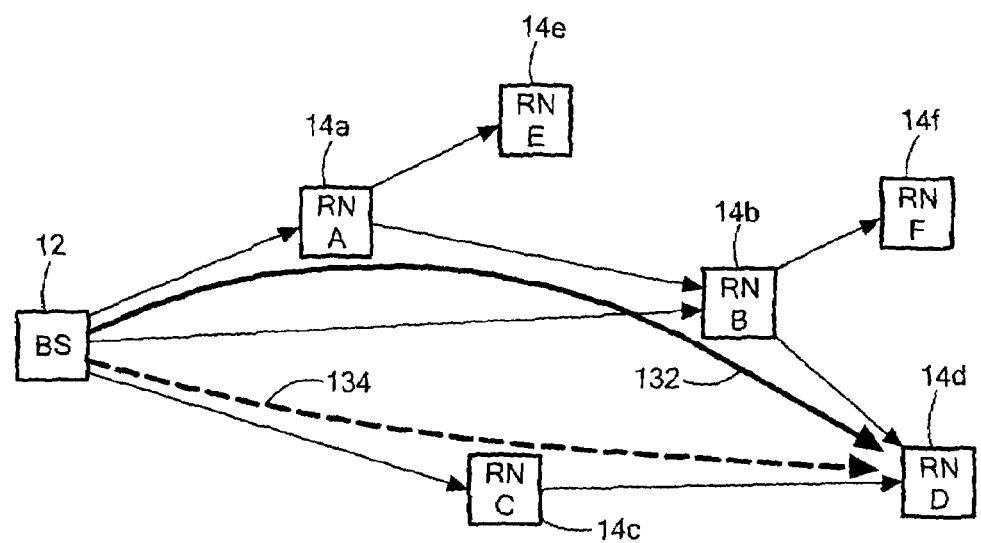
FIG. 12 is a block diagram of a primary/assistant path relay node topology constructed in accordance with the principles of the present invention.

Diversity can also be reflected by a path definition arrangement that includes a primary path and one or more assistant paths. This arrangement is shown in the primary/assistant path relay node topology diagram of FIG. 12. Under this arrangement, the primary path is the path along parent relay nodes 14 mainly for resource assignment control signaling. For example, the parent, i.e. anchor, node for relay node 14d is relay node 14b. The parent node for relay 14b is relay node 14a. The primary path is shown in FIG. 12 as primary path 132.

The assistant path is the path along non-anchor stations and is not visible to the effected relay node. For example, an assistant path between base station 12 and relay node D14d is shown as assistant path 134 and includes a path using relay node C 14c. The use of assistant path 134 is on a best effort basis and can be controlled by a multi-path diversity controller. Although not shown, it is contemplated that a multi-path diversity controller can be implemented as part of base station 12, a relay node 14 or a separate computing device (not shown) that is in electronic communication with base station 12 and relay nodes 14. Referring to FIG. 12, if only the primary path is considered, the tree structure used to support arrangements under existing wireless communication standards such as the IEEE 802.16j standard is maintained. In other words, the present arrangement shown in FIGS. 11 and 12 allows for backward compatibility with existing networks and standards while providing the additional functionality described herein.

Relay node path selection is now described. As used herein, the term "relay node path selection" refers to the selection of a path between a serving base station 12 through its associated relay nodes 14 to a destination relay node 14. Path selection includes two parts, namely initial path selection and path updating. Initial path selection occurs as a relay node 14 enters or reenters the network. Such relay nodes 14 can be fixed, portable or mobile. Path updating occurs when a portable or mobile relay node 14 is handed over from one base station 12 or relay node 14 to another. Path updating can also occur as the cell topology changes such as when a new relay node 14 is added or removed from system 10. In this case, other neighbor relay nodes 14 may need to reselect a path by taking the new relay node 14 into consideration due to the topology change. Path updating may also occur when the quality of the current path is degraded whether due to congestion, noise, etc.

Relay node path selection also involves the definition and implementation of a path selection policy with respect to the consideration of path selection policy factors that impact path selection and how to output the path selection. Factors that impact path selection include limitations on the number of hops through the network, i.e. a delay requirement, link quality, link capacity, as well as path capacity requirements. Path selection output with respect to path selection policy refers to the means by which active path and redundant path information is output.

It is contemplated that the determined and defined path can be symmetric with respect to communication in the uplink (mobile station 16 to base station 12) and downlink (base station 12 to mobile station 16) directions or can be asymmetric in the uplink and downlink directions. The path selection can be determined purely by base station 12, relay nodes 14 or a combination of relay node 14 and base station 12, for example by a completely distributed arrangement or one which is partially distributed in which a master relay node 14 works in conjunction with a base station 12 to determine the path.

Preambles are included in wireless communication frames to facilitate radio environment measurement by relay nodes 14 for relay node path selection as well as synchronization among relay nodes 14. The present invention provides an arrangement to facilitate preamble transmission by relay nodes 14, referred to as a relay node preamble, without interrupting other uses of the preamble, for example cell selection by mobile stations 16 such as are implemented in IEEE 802.16e wireless communication networks. In other words, the present invention provides a relay node preamble arrangement which maintains backward compatibility with mobile stations 16 to allow mobile stations 16 to communication with relay nodes 14 in the same manner that IEEE 802.16e mobile stations 16 would communicate with a serving base station 12.

In accordance with the present invention, a relay node preamble is periodically transmitted, for example every N 802.16e frames, by relay nodes 14 after entering the network. This relay node preamble is transmitted within an uplink or downlink frame, for example, an IEEE 802.16e uplink sub-frame or downlink sub-frame. Each relay node's preamble pseudo noise ("PN") sequence may be the same as assigned to the preamble or may be different. The retransmission and receipt of the relay node preamble is synchronized so that at the transmission time for the relay node preamble, only one relay node is receiving and all others are transmitting to ensure that the measurement yields a reasonable result. Put another way, if a relay node 14 is transmitting, it cannot simultaneously measure and receive the relay node preamble. It is contemplated that the relay node preamble can be transmitted on a common channel for multiple-carrier enabled and common-channel defined networks. It is also contemplated that relay node preamble reuse within a cell is possible. In such a case, a limited number of PN symbols are available, but transmission is limited so that the preamble can be reused in other areas.

As noted above, if a relay node 14 is configured to be a serving station, that is to deliver and collect traffic to and from mobile stations 16 (during normal operation), the relay node 14 transmits a preamble, such as an IEEE 802.16e preamble, to facilitate cell selection by mobile station 16. However, at the same time due to radio link changes and removal and addition of relay nodes 14, relay nodes 14 continuously monitor their radio environments for purpose of path selection. While one might consider using existing preambles, such as those defined under IEEE 802.16e for such a purpose, this arrangement does not work because when a relay node 14 monitors 802.16 preambles, it must stop its own 802.16 preamble transmission, thereby interfering with the normal operation of mobile stations 16.

A relay node preamble implemented in accordance with the principles of the present invention is transmitted every N frames, referred to as a relay node preamble cycle. The parameters for the relay node preamble, e.g., index, PN sequence, etc. may be the same as an 802.16e preamble for a relay node 14 that is configured to support 802.16 preamble transmission. However, by using a relay node preamble in accordance with the present invention, a relay node does not need to stop its 802.16e preamble transmission for the purpose of its own radio environment measurement.

In order to obtain a reasonable radio environment measurement, a perfect operating environment would be arranged such that at any relay node preamble transmission time only one relay node is monitoring and all others are transmitting. Thus, network-wide relay node preamble plans to avoid more than one relay node monitoring relay node simultaneously, can be used. For example, each base station 12 can explicitly establish and indicate the preamble transmission plan to relay nodes 14 associated with that base station 12. In another case, base stations 12 can coordinate scheduling with each other. In either case, this requires extensive synchronization efforts and is difficult to plan due to the removal and addition and movement of relay nodes and master relay nodes.

As such, it is more characteristic that only a small number of relay node preambles can be detected by a relay node 14. Those relay nodes 14 whose relay node preambles can be detected by a relay node 14 may be within a relatively small geographic area around the transmitting relay node 14. If a time interval is defined that includes a small number of relay node preamble cycles and each relay node randomly selects one relay node preamble cycle within this interval for monitoring relay node preamble transmission, the possibility that more than one relay node 14 within this small geographic area is monitoring relay node preambles is very small.

Figure 13:
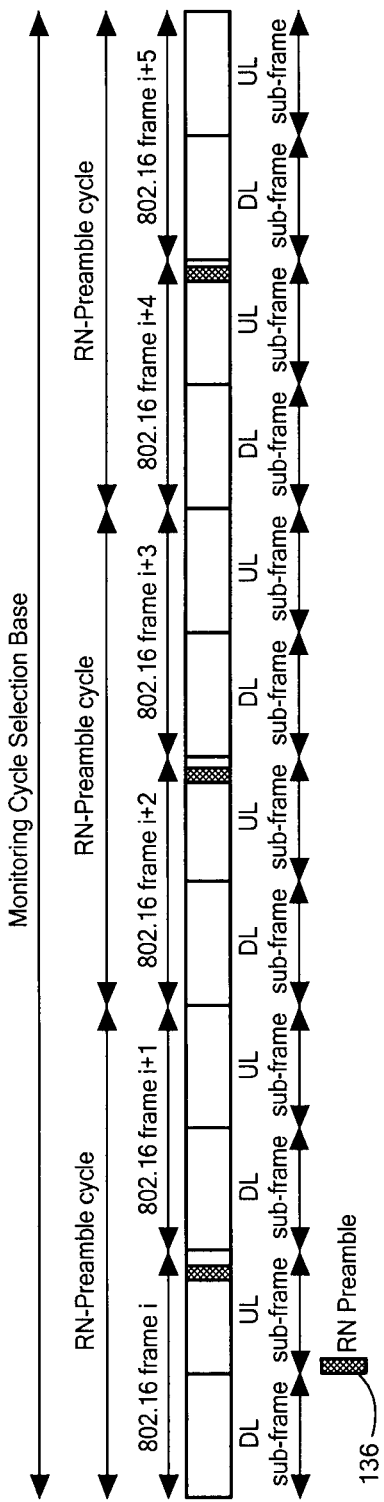
FIG. 13 is a diagram showing an exemplary relay node preamble transmission timing arrangement constructed in accordance with the principles of the present invention.

Relay node preamble transmission constructed in accordance with the principles of the present invention is explained with reference to the diagram shown in FIG. 13. In accordance with the present invention, "M" relay node preamble transmission cycles form a base, also referred to as a relay node preamble monitoring cycle selection base, from which a monitoring cycle is randomly selected by a relay node 14. FIG. 13 shows M=3. In accordance with this arrangement, a number of parameters are contemplated and configured. A relay node preamble transmission cycle ("N") defines the transmission period of the relay node preamble. In other words, a relay node preamble is transmitted every "N" frames. FIG. 13 shows N=2. The first frame in each cycle is referred to as the relay node preamble frame, where an OFDM symbol is reserved for relay node preamble transmission. The relay node preamble monitoring cycle selection base ("M") defines the number of cycles within which a relay node randomly selects a cycle and stops its own relay node preamble transmission to monitor other relay node preambles in the corresponding relay node preamble frame. This arrangement avoids the need for system wide synchronization. A base starting frame offset ("k") identifies the index of the frame which starts a base period. Thus, a relay node preamble transmission base starts from a frame indexed as "i" with "i" meeting the formula: mode(i, M×N)=k. Each base includes M×N frames and M cycles. The cycle can be indexed from 0 to M−1. The relay node preamble OFDM symbol offset within a relay node preamble frame "j" identifies the OFDM symbol index within the relay node preamble frame, thereby referring to the first OFDM symbol in the frame.

In sum, relay node preambles are transmitted in relay node preamble window 136. The window is randomly selected by each relay node 14 as to when it will transmit and when it will receive. To do this, one frame within a cycle is randomly selected during which the relay node 14 will monitor. The relay node 14 transmits during the other windows. This arrangement advantageously allows for the maintenance of synchronization and also to enable ongoing radio environment measurement to facilitate path updating.

Where backward IEEE 802.16e compatibility is not required, the above-described preamble arrangement can be used for both relay node radio environment measurement and for transmission to mobile stations 16.

As discussed above, there are a number of factors that can be considered for path selection. These include the number of hops, link quality and path capacity room. With respect to the number of hops, the number of hops of a relay node 14 is defined as the number of hops from the serving base station 12 to that relay node 14. After a relay node enters the network, the parameter "num_hop" of the relay node 14 can be broadcast. Such broadcast can be accomplished, for example through a modified downlink channel descriptor ("DCD") MAC message or as a new relay node message, e.g. ("RN_CONF").

Link quality is defined herein as the carrier interference to noise ratio ("CINR") or other measurement from a relay node 14 to a neighbor relay node/base station. For example, referring to FIG. 14, link quality can be measured as the CINR or other measurement between RN C 14c and base station 12 or RN C 14c and RN B 14b. In such case, relay node C 14c acquires link quality by measuring preambles such as IEEE 802.16e preambles at initial network entry or reentry or, on an ongoing basis, by measuring the IEEE 802.16e preamble or the relay node preamble, if implemented.

Figure 14:
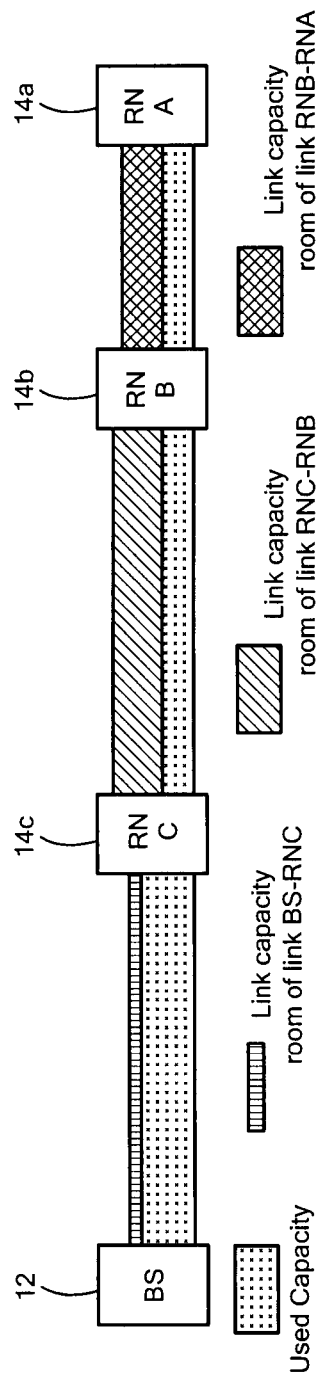
FIG. 14 is a diagram of path capacity through an exemplary network path.

Path capacity room refers to the capacity over the entire path from end to end if a particular path were used, i.e., the capacity of the most loaded link in the potential path. In such case, path capacity room is defined as the additional data rate the path can support, which as noted above, is the minimum capacity room along the path. Referring to FIG. 14, it is observed that the link between base station 12 and relay node C 14c not only has the lowest capacity but also the most used capacity. The result is that the link capacity with respect to the room available for additional transmission in the link between base station 12 and relay node C 14c is the smallest. Accordingly, the path capacity room and the path from base station 12 to relay node A 14a is the unused (blank) capacity remaining between base station 12 and relay node C 14c. Data corresponding to the path capacity room parameter can be broadcast using a modified DCD message or any other message format used by a relay node 14 for communication.

Initial relay node path selection is described. It is contemplated that the present invention can provide relay node path selection using a non-centralized controlled, i.e. distributed, approach in which the new relay node 14 makes the path selection or a centralized approach in which the base station 12 collects information and makes the path decision. The non-centralized controlled initial path selection arrangement is considered first.

Under the non-centralized approach, a new relay node, i.e. relay node A 14a measures downlink preambles, such as IEEE 802.16e preambles. The relay node selects uplink station based on radio link metrics, i.e., the radio environment.

For example, relay node A 14*a* might select relay node B 14*b* based on radio link metrics. Relay node A monitors relay node B 14*b* for a new type length value ("TLV") for an IEEE 802.16e DCD or through another suitable broadcast message. The path selection factors discussed above can be monitored.

Neighbor information acquisition can be obtained based on this broadcast. Under this arrangement, relay node A 14*a* can continue to decode the messages using, for example, an IEEE 802.16e mobile neighbor advertisement ("MOB_N-BR_ADV") with a new TLV or a new relay node message such as an "RS_NBR_ADV" message. Message formats are discussed above. The message includes information, for each associated relay node 14, for the path selection factors.

Relay node A 14*a* sends a ranging code in the uplink initial ranging regions and then sends a ranging request using a new TLV, such as an IEEE 802.16e "RNG-REQ" message with a new TLV to include this information. In this case, the RNG-REQ message includes the MAC address of the relay node A 14*a* or a preassigned relay node id along with the top M strongest pseudo noise sequence indices.

In the alternative, neighbor information can be acquired on demand. This arrangement requires lower overhead than the broadcast acquisition method discussed above. In this case, relay node B 14*b* can send an RNG-REQ with information for the base station 12 (or relay nodes 14 corresponding to the top M PN indices). For each PN index, the path selection factors discussed above are included.

Relay node A 14*a* determines the path based on a predetermined algorithm. As noted above, this predetermined path selection algorithm is beyond the scope of the present invention, being understood that methods for path selection given a set of path selection factors is known. If relay node A 14*a* selects relay node B 14*b*, relay node A 14*a* continues communication using relay node B 14*b*. If relay node A 14*a* does not select relay node B 14*b*, or selects relay node B 14*b* as a candidate path, relay node A 14*a* will repeat the above selection process using the selected primary (parent) relay node 14.

With respect to relay node path selection, it was noted that new TLVs can be defined in accordance with the present invention. With respect to the DCD, the new TLV can include the number of hops and path capacity room and the new TLV in the RNG-REQ message can include the number of PN indices M as well as the M PN index value. Of course, the present invention is not limited to such. It is contemplated that messages and path selection factors other than those noted and discussed above can be used. It is also contemplated that not all paths selection factors must be considered within the path selection algorithm and that one or more factors can be used depending on the requirements of the system designers and/or providers.

Initial relay node path selection using a centralized approach in which base station 12 collects information and makes the path decision is described. Under this arrangement, the new relay node, e.g. relay node A 14*a*, measures downlink preambles such as downlink IEEE 802.16 preambles. Relay node A 14*a* selects a station, e.g. relay node B 14*b*, based on radio link metrics. Relay node A 14*a* monitors relay B 14*b* for the transmission of messages such as IEEE 802.16e DCD or some other suitable relay node information message. Neighbor information acquisition can be obtained by broadcast in which relay node A 14*a* continues to decode the IEEE 802.16e MOB_NBR-ADV message using a new TLV or a new relay RN_NBR_ADV message.

Relay node A 14*a* can send a ranging code in the uplink initial ranging region and transmit an IEEE 802.16e RNG-REQ with a new TLV in which the new TLV includes the relay node MAC address or preassigned relay node id and the top M strongest PN sequence indices. Base station 12 determines the path(s) for relay node A 14*a* and information for the selected path(s) is transmitted to relay node B 14*b* through control layer messaging, for example, using RNG-RSP or REQ-RES messages.

In addition to initial path selection, it is contemplated that the present invention can support path updating such as may be necessitated by a radio link change resulting from handoff in the case of mobile or relocated relay nodes or link quality degradation. In the case of updating path selection, relay node A 14*a* monitors relay node preambles (or IEEE 802.16e preambles) and records the channel quality. Relay node A 14*a* sends an update request message that includes a list of PN indices and the measurements. In the case where path selection is centralized, base station 12 receives this information and determines the selected path. In this case, base station 12 sends a path update message including the list of base station and/or relay station id's. In a case where path determination is non-centralized, base station 12 sends a path update message to relay nodes 14 that includes a list of relay node id's. For each relay node in the update message, one or more path selection factors are included. In this case, relay node A 14*a* determines the selected path and sends a path update message that includes the relay node (and base station) path list.

It is contemplated that existing standards can be modified to introduce the new messages that include the path selection factors such as an "RF_path (route) update-REQ" message. It is also contemplated that an update response message can be added to existing standards that includes the list of relay node (and base station) node id's. It is also contemplated that path updating may be necessitated by a topology change such as where a new relay node 14 is added or an existing relay node 14 is removed. In such case, base station 12 can broadcast or multicast the topology change to its associated relay nodes 14. The topology change can be sent to all associated relay nodes 14 or a subset of relay nodes 14, such as those that are impacted by change. This can be done by a topology update message that includes the id, e.g., PN index, of the relay node to be added or removed as well as a preambled transmission schedule update. Base station 12 can provide an updated preamble transmission/monitoring schedule to its associated relay nodes 14.

In this case, the impacted relay node, such as relay node A 14*a*, follows the updated preamble transmission schedule to measure the channel quality of each of its neighbor relay nodes 14. Relay node A 14*a* sends a path update request message with the list of PN indices and measurements. The new path can then be determined and broadcast using arrangements described above for centralized and de-centralized controlled arrangements for path updates caused by radio link changes.

Topology Learning

Topology learning refers to the procedure under which base station 12 updates its local topology, i.e. route, table within its cell whenever the local topology changes. Under this arrangement, base station 12 asks relay nodes 14 to take new channel measurements to establish performance values for the new topology. The topology table includes all associated active relay nodes 14, and for each active relay node 14, the active link established with its one or multiple neighbor relay nodes 14.

With respect to the physical topology learning procedure, when a new relay node 14 enters the network and after the path selection determination is made, base station 12 updates its topology table and requests that the path selection update, discussed above, be undertaken by one or more of the existing relay nodes 14. When a relay node 14 is to be removed, base station 12 updates its topology table after receiving a relay node power off request message from a relay node 14. Base station 12 requests the path selection update procedure discussed above be performed by the effected relay nodes 14. On the converse side when base station 12 receives a path selection or path update request message with an updated path selection, base station 12 updates its topology table accordingly.

Congestion Control

Congestion can be caused by a number of factors, including but not limited to broken links, link capacity degradation and input traffic having a rate higher than the link throughput capacity. For intra-cell congestion control, such congestion control can be controlled by base station 12 or a master relay node 14. In this case, status updates by associated relay nodes 14 are polled by the base station 12 (or master relay node 14) or autonomously reported by the associated relay nodes 14. The status update can include the downlink buffer status for each child relay node 14, depending requested bandwidth in the uplink for each child relay node 14 or even a suggested removal of some percentage of traffic to be forwarded. In response, the base station 12 or master relay node 14 can request some mobile stations 16 perform handoff to another relay node 14 or base station 12 by sending an appropriate message such as an IEEE 802.16e MOB_BSHO-REQ message. Base station 12 or master relay node 14 may also request that some relay nodes 14 perform path updating through the transmission of an appropriate path update message. In the case where existing communication standards are used, the intra-cell congestion control messages can be implemented through the introduction of a new TLV. Congestion can be an event that triggers a switch between the active path and the redundant path.

Relay Station MAC Message Format

A number of MAC messages are described above for implementing the functions of the present invention. It is contemplated that relay node-related MAC messages can use a unicast MAC message format or a broadcast MAC message format, as appropriate. It is contemplated that existing naming conventions can be used to describe these messages, such as "RS_XXX-REQ" and "RS_XXX-RES" message naming for unicast MAC messages and "RS_XXX-ADV" for broadcast messages where the "XXX" refers to the specific name of the MAC message and can for example be an 8-bit message. This arrangement allows the reuse of a message body format that is currently used for the IEEE 802.16e wireless communication standard.

Although reference was made to existing standards such as the IEEE 802.16e, j and IEEE 802.11s standards, the entirety of all of which are incorporated herein by reference, it is understood that the present invention is not limited solely to the use of these standards and that reference to these standards is made for the purpose of illustration and explanation, as well as the understanding that the functions of the present invention can be implemented by extending the standards as described herein.

The present invention provides a method and system by which topology-related aspects of relay node based wireless communication networks can be enhanced to provide redundant path selection (while maintaining the appearance of a tree topology for backward compatibility), including initial path selection and path updating, as well as physical topology changes and congestion control.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A wireless communication method for a network having a tree topology, the method comprising:
   selecting an initial path from a base station to an end relay node, the initial path selection including an active communication path and a redundant communication path, the initial path selection being based on at least one policy factor;
   measuring, at a relay node, a sequence received from a neighboring relay node to determine the at least one policy factor, wherein measuring the sequence received from the neighboring relay node includes:
      randomly selecting a monitoring cycle from a monitoring cycle selection base, the monitoring cycle selection base comprising a plurality of preamble cycles;
      stopping transmission of a relay node preamble during the selected monitoring cycle; and
      transmitting relay node preambles during the remaining preamble cycles of the monitoring cycle selection base other than the selected monitoring cycle; and
   updating the initial path selection based on a change to the at least one policy factor determined from the measured sequence.

2. The method of claim 1, wherein the network is an IEEE 802.16j network.

3. The method of claim 1, wherein the active communication path and the redundant communication path are defined as an equivalent path from the base station to the end relay node.

4. The method of claim 1, wherein the active communication path and the redundant communication path are defined as a primary path and assistant path, respectively, from the base station to the end relay node.

5. The method of claim 1, wherein the initial path selection is distributed and is determined at least in part by a relay node.

6. The method of claim 1, wherein the initial path selection is centralized and is determined by a base station.

7. The method of claim 1, further comprising:
   storing a topology table corresponding to a local topology;
   detecting a change in the local topology; and
   requesting a path selection update.

8. The method of claim 1, wherein an architecture of the topology is a hierarchical topology, the hierarchical topology including a master relay node supporting a group of relay nodes.

9. A wireless communication system for a network having a tree topology, the system comprising:
   a base station;
   a first relay node in communication with the base station; and
   a second relay node in direct communication with at least one of the base station and the first relay node, an active communication path being established based at least in part on a first policy factor from the base station to the second relay node and a redundant communication path being established based at least in part on a second policy factor from the base station to the second relay node, the redundant communication path being different than the active communication path and at least one of the active communication path and the redundant communication path including the first relay node;
   wherein the first policy factor is determined by measuring a first sequence received from a first neighboring relay node and the second policy factor is determined by measuring a second sequence received from a second neighboring relay node; and wherein the first relay node and the second relay node are configured to:
- each randomly select a monitoring cycle from a monitoring cycle selection base, the monitoring cycle selection base comprising a plurality of preamble cycles;
- stop transmission of a relay node preamble during the selected monitoring cycle; and
- transmit relay node preambles during the remaining preamble cycles of the monitoring cycle selection base other than the selected monitoring cycle.

10. The system of claim 9, wherein the network is an IEEE 802.16j network.

11. The system of claim 9, wherein the active communication path and the redundant communication path are defined as an equivalent path from the base station to the second relay node.

12. The system of claim 9, wherein the active communication path and the redundant communication path are defined as a primary path and assistant path, respectively, from the base station to the second relay node.

13. The system of claim 9, wherein the active and redundant communication paths are selected by the second relay node.

14. The system of claim 9, wherein the base station includes a storage device storing a topology table corresponding to a local topology, and wherein the base station operates to detect a change in the local topology and requests a path selection update, the path selection update comprising the active communication path and the redundant communication path.

15. The system of claim 9, wherein an architecture of the topology is a hierarchical topology, and wherein at least one of the first relay node and the second relay node is a master relay node supporting a group of relay nodes.

* * * * *